United States Patent [19]

Shiba et al.

[11] Patent Number: 5,796,907
[45] Date of Patent: Aug. 18, 1998

[54] OPTICAL TRANSMISSION LINE OPTICAL TRANSMITTER, AND PHOTOGRAPHIC PRINTING APPARATUS

[75] Inventors: Teruo Shiba; Michio Oishi; Masazumi Ishikawa; Tohru Tanibata, all of Wakayama-ken, Japan

[73] Assignee: Noritsu Koki Co., Ltd., Wakayama-ken, Japan

[21] Appl. No.: 552,478

[22] Filed: Nov. 9, 1995

[30] Foreign Application Priority Data

Nov. 9, 1994 [JP] Japan ................................. 6-275017
Sep. 26, 1995 [JP] Japan ................................. 7-247836

[51] Int. Cl.$^6$ ........................................ G02B 6/00
[52] U.S. Cl. ........................... 385/133; 385/115; 385/121
[58] Field of Search ............................. 385/46, 54, 47, 385/133, 115–121

[56] References Cited

U.S. PATENT DOCUMENTS 3,904,269  9/1975  Lebduska et al. ................... 385/54

FOREIGN PATENT DOCUMENTS 25 05 046   8/1976  Germany ............................. 385/54
59-58407    4/1984  Japan ................................. 385/54
61-243411  10/1986  Japan ................................. 385/47
62-8109     1/1987  Japan ................................. 385/47
1-196007    8/1989  Japan ................................. 385/47

*Primary Examiner*—John Ngo
*Attorney, Agent, or Firm*—Wenderoth, Lind & Ponack, L.L.P.

[57] ABSTRACT

An optical transmitter having a higher diffusiveness and a higher transmittivity simultaneously is constructed so that a light from a lamp 2 of light source enters an optical fiber materials A and is transmitted to a reflector tube 1 of which mirror surface of the inner side is formed by vacuum deposition. The diffused light components in the reflector tube 1 are reflected on the mirror surface and directed towards an optical fiber materials B and transferred to an exposure device 3 having a PLZT shutter.

5 Claims, 5 Drawing Sheets

OPTICAL TRANSMISSION LINE OPTICAL TRANSMITTER, AND PHOTOGRAPHIC PRINTING APPARATUS

BACKGROUND OF THE INVENTION

The present invention relates to improvement of an optical fiber for transmission of light and to an apparatus employing the same.

There has been used a bundle of optical fiber materials for transmission of light. Such optical fiber bundles are commonly available for use in an exposure mechanism of a photographic printing apparatus.

In such a conventional photographic printing apparatus as shown in FIG. 6, exposure light emitted from a light source 6a is transmitted through an optical fiber bundle 6b to a PLZT exposure head 6c for digital exposure operation. Also, diffuser plates 6e for diffusion of the exposure light are disposed between the light source 6a and the optical fiber bundle 6b, and between the optical fiber bundle 6b and a PLZT shutter 6d, thus preventing the intensity of light produced by the light source 6a from varying unevenly and hence declining the quality of an exposure developing image.

The diffuser plates are however disadvantageous in a system in which light is transmitted uniformly through a bundle of optical fiber materials, because the diffuser plates 6e are as low as less than 50% in the light transmittivity. As the diffuser plates 6e are increased in diffusiveness, their light transmittivity falls down thus declining the exposure operation of the system.

It is hardly possible to have a higher diffusiveness and a higher transmittivity simultaneously.

An object of the present invention is to provide an optical transmitter having a higher diffusiveness and a higher transmittivity simultaneously and also, a photographic printing apparatus capable of performing an exposure action at higher quality and effectiveness.

SUMMARY OF THE INVENTION

An optical transmission line includes a reflector tube which has a mirror surface on the inner side thereof and is connected to a light incident side of a bundle of optical fiber materials.

In an optical transmission line, the mirror surface of the inner side of its reflector tube is formed by vacuum deposition.

In an optical transmission line, the light incident side of its optical fiber bundle is connected to a single optical fiber of which diameter is substantially equal to that of the optical fiber bundle.

An optical transmitter comprises an optical transmission line which includes a reflector tube having a mirror surface on the inner side thereof and connected to a light incident side of a bundle of optical fiber materials.

In an optical transmitter, the mirror surface of the inner side of its reflector tube is formed by vacuum deposition.

In an optical transmitter, the light incident side of its optical fiber bundle is connected to a single optical fiber of which diameter is substantially equal to that of the optical fiber bundle.

Photographic printing apparatuses for transmitting exposure light emitted from a light source through a bundle of optical fiber materials to an exposure head for exposure operation allow the optical transmission lines to be mounted across their respective optical fiber bundles.

DETAILED DESCRIPTION OF THE PREFERRED EMBODIMENTS

The embodiments of the present invention will be explained in more details.

Figure 1:
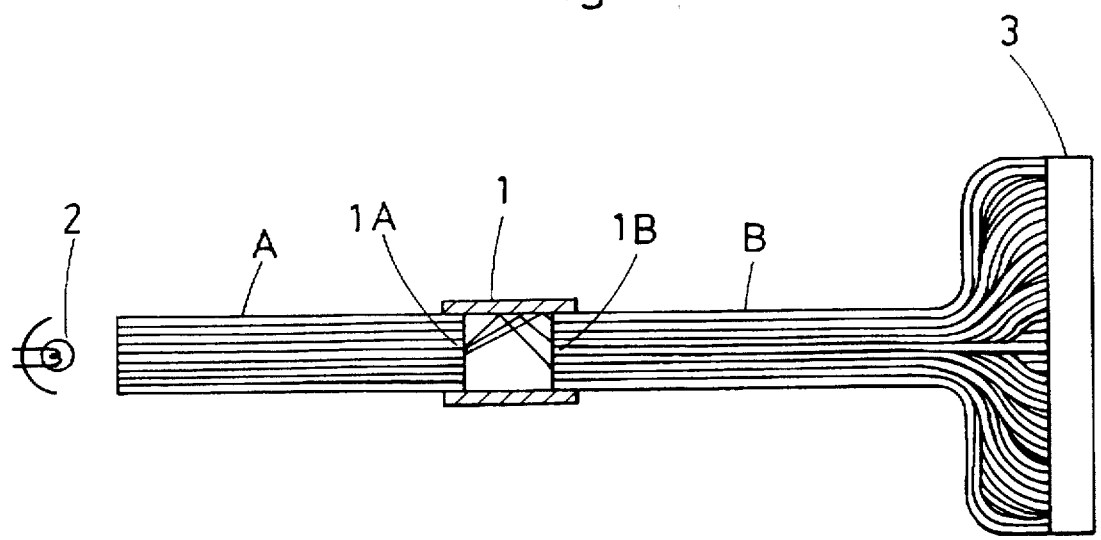
FIG. 1 is a cross sectional side view showing a primary part of one embodiment of the present invention.

As shown in FIG. 1, a reflector tube 1 has a mirror finish provided on the inner surface thereof by a vacuum deposition method. There are a lamp 2 of light source arranged as an optical transmitter and an exposure device 3 provided with a PLZT shutter as an optical receiver. Also, shown are a bundle of optical fiber materials A at the light source side and another bundle of optical fiber materials B at the exposure device side.

The two optical fiber bundles A and B and the reflector tube 1 form an optical transmission line. An optical transmitter comprises the lamp 2, the exposure device 3, and the optical transmission line.

In the optical transmitter shown in FIG. 1, an intensity of light emitted from the lamp 2 enters the optical fiber materials A from different angles and is transmitted through the optical fiber bundle A to one end 1A of the reflector tube 1 where it is diffused at various angles. The diffusion results from the fact that each light component incident on an optical fiber is departed at an angle equal to the incident angle.

The diffused light components in the reflector tube 1 are reflected on the mirror surface and directed towards one end 1B of the optical fiber bundle B.

The incident angle of each light component on the mirror surface of the reflector tube 1 is identical to the reflected angle, and hence, the diffused light components from the optical fiber bundle A are reflected at different angles. More specifically, the intensity of light from each optical fiber material of the bundle A is distributed through a plurality of the optical fiber materials B. Accordingly, each of the optical fiber materials B receives multiple components of the incident light from the optical fiber bundle A, and regardless of variations in the incident light at the light source side, a uniform intensity of exposure light will hence be released at the exposure device side.

Figure 2:
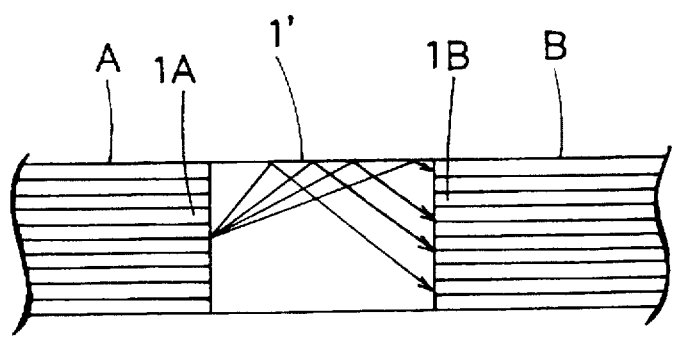
FIG. 2 is a cross sectional side view showing a primary part of another embodiment of the present invention.

Another optical transmission line is shown in FIG. 2 in which the reflector tube 1 of FIG. 1 is replaced with a large diameter optical fiber 1'.

The large diameter optical fiber 1' with a short length is connected inbetween across a bundle of optical fiber materials 1 as shown in FIG. 2.

More particularly, the large diameter optical fiber 1' is joined at one end by a connector (not shown) to the flat end 1A of an optical fiber bundle A at the light source side, and at the other end by a connector (not shown) to the flat end 1B of an optical fiber bundle B at the exposure side.

In the large diameter optical fiber 1' like the reflector tube of FIG. 1, incoming light is diffused and separated into various components which are directed at different angles to the optical fiber materials B at the exposure side. Each incident light from the optical fiber material of the bundle A is diffused and directed to a plurality of the optical fiber materials B. Accordingly, each of the optical fiber materials B receives multiple components of the incident light from the optical fiber bundle A. As the result, regardless of variations in the incident light at the light source side, a uniform intensity of exposure light will be released at the exposure side.

As set forth above, the optical transmission lines shown in FIGS. 1 and 2 allow the uniform intensity of light to be constantly released at the exposure side even if the incident light is not uniform.

The reflector tube 1 and the optical fiber 1 may substantially be identical in the diameter to the optical fiber bundles A and B respectively.

Embodiment 1

A photographic printing apparatus employing the prescribed light transmission line and optical transmitter will be described.

Figure 3:
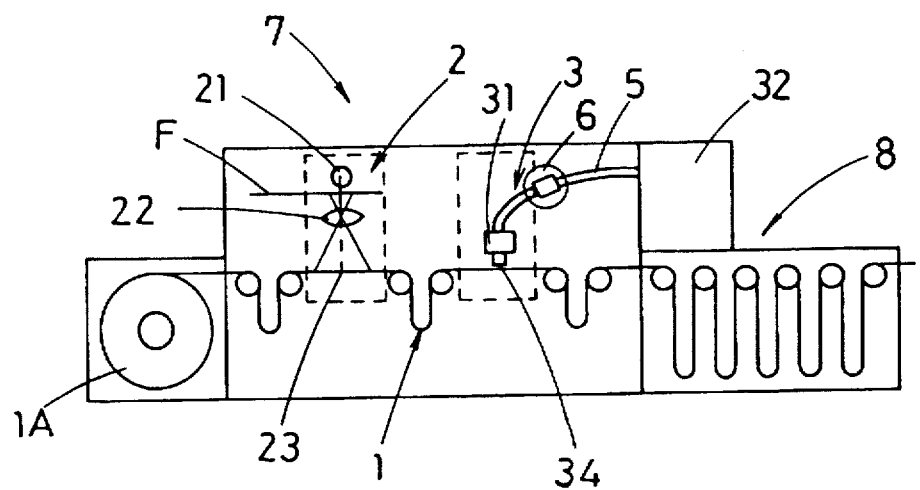
FIG. 3 is a schematic view of a photographic printing apparatus according to the present invention.

FIG. 3 is a schematic view of the photographic printing apparatus, denoted by 7, which has an exposure means 72 and a double exposure means 73 arranged along a transfer direction of a printing paper P (photosensitive material) unloaded from a magazine 7A.

The photographic printing apparatus 7 is also connected to a processor 8 for developing process of the printing paper P.

The exposure means 72 comprises a light source 21, a lens 22, light modulation filter (not shown) arranged for movement to and from a light path between the light source 21 and a negative film F, and a mechanism shutter (not shown) for mechanically interrupting the light path from the light source 21. Exposure light emitted from the light source 21 is passed through the negative film F and focused on the printing paper P paused at a negative exposure station 23 for producing an photographic image (FIG. 3).

The double exposure means 73 is provided for exposing the printing paper P transferred dot by dot to light of a linear PLZT exposure head 31 which is oriented at a right angle to the transfer direction of the printing paper P.

The PLZT exposure head 31 has rows of PLZT shutters aligned thereon for controlling an intensity of light transmitted through a bundle of optical fiber materials 59 from a PLZT light source 32 and producing dots of an image on the printing paper P at a line exposure station 34 under the PLZT exposure head 31 (FIG. 3).

The shutter action of the PLZT shutters of the PLZT exposure head 31 is initiated by a control voltage of each color supplied from a controller (not shown) responsive to an image signal.

The optical fiber bundle 5 consisting of the optical fiber materials 53 has a reflector tube 6 mounted across an intermediate region thereof as shown in FIG. 1.

The optical fiber bundle 5 of the light source side is fitted into one end of the reflector tube 6 which is in turn connected at the other end to the same of the exposure side (FIG. 1).

The inner surface of the reflector tube 6 is mirror finished with Astrolite (a tradename) and has an inner diameter equal to the outer diameter of the optical fiber bundle 5 (FIG. 1).

Accordingly, the intensity of light from the PLZT light source 32 is transmitted through the optical fiber bundle 5 and diffused on the inner surface of the reflector tube 6 before supplied to the PLZT exposure head 31.

Embodiment 2

The optical fiber bundle 5 in the photographic printing apparatus of Embodiment 1 is replaced with such an optical transmitter of optical fiber as shown in FIG. 2.

Both an exposure means and a double exposure means of this embodiment are similar in construction to those of Embodiment 1, excluding the optical fiber materials.

An intensity of light emitted from a PLZT light source 32 is transmitted through a bundle of optical fiber materials and before supplied to a PLZT exposure head 31, diffused in a larger diameter optical fiber which is short in length and disposed across an intermediate region of the optical fiber bundle.

The foregoing optical transmission line and transmitter are not limited to installation in the photographic printing apparatus but applicable to any system employing optical fiber materials for an optical transmission line and an optical transmitter.

For example, the present invention may be embodied in the form of an optical transmission line for a light source in image capture means including a facsimile machine, a copier, and a scanner, for an electronic shutter light source in printer or display means, or for any type of illuminating device.

Embodiment 3

Figure 4A:
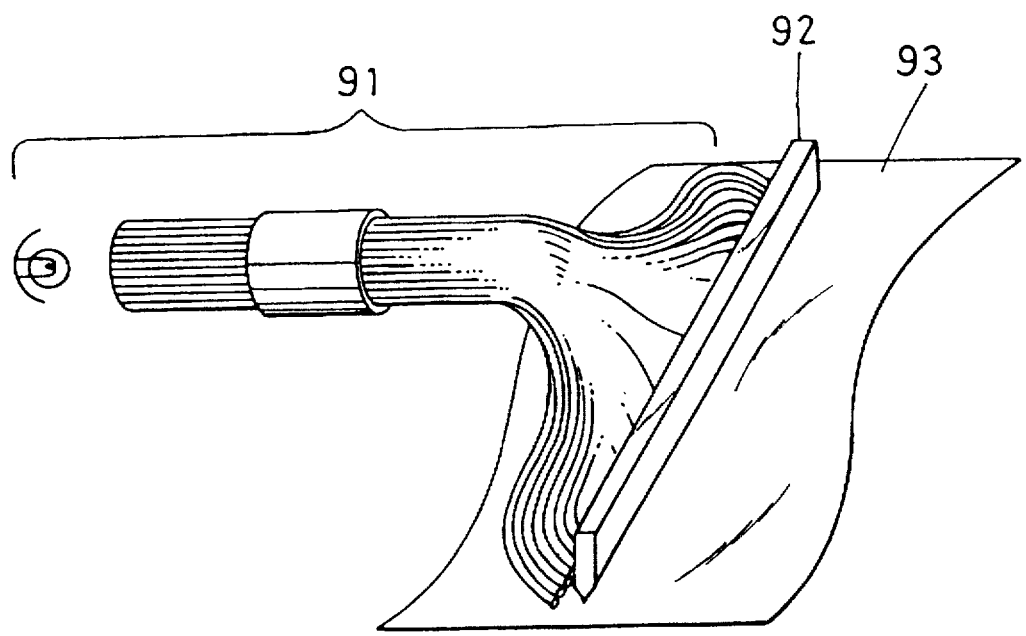
FIGS. 4a & b are structural views showing a modification of any of the embodiments.
Figure 4B:
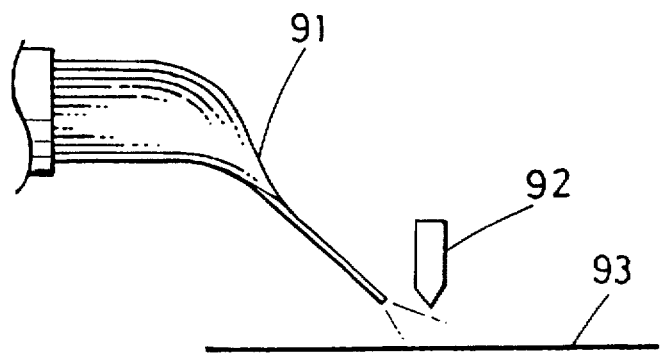

Referring to FIG. 4(A), shown are a light source 91 provided with an optical transmission line for text reading according to the present invention, and a line sensor 92 for reading a text 93 irradiated by the light source 91. While the text 93 is irradiated from upper left by the light source 91, it is read from just above by the line sensor 92, as best shown in FIG. 4(B).

This embodiment is applicable to an image capture means in a facsimile machine, copier, or scanner.

Embodiment 4

Figure 5:
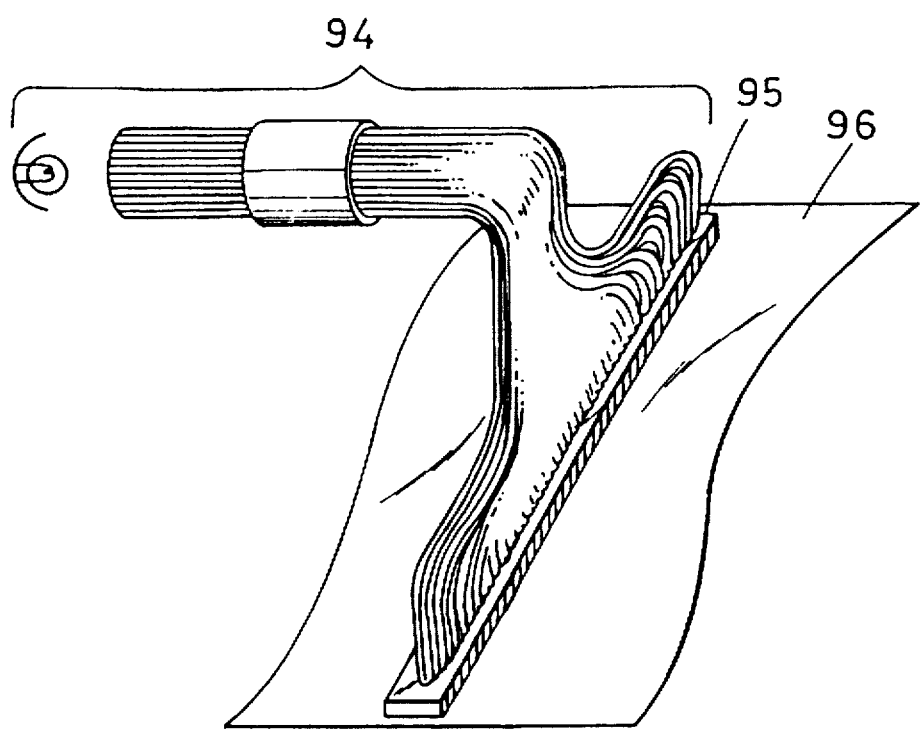
FIG. 5 is a cross sectional side view showing a primary part of an optical transmission line according to the present invention.
Figure 6:
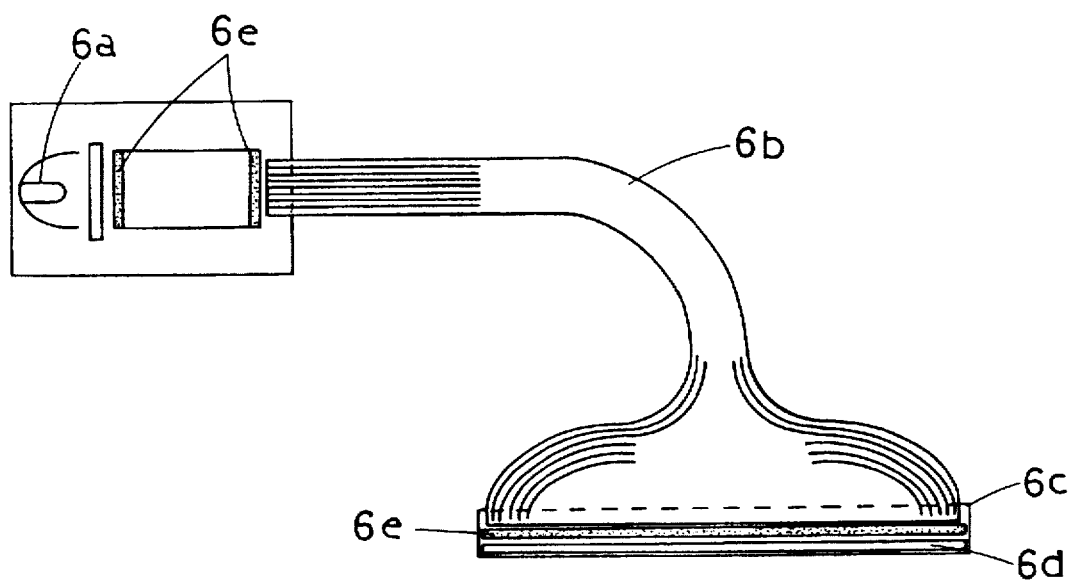
FIG. 6 is a front view showing a prior art.

FIG. 5 illustrates a light source 94 provided with an optical transmission line according to the present invention, in which a plurality of optical fiber materials are aligned in a straight line for producing a uniform irradiation of light for exposure action. Also, an electronic shutter 95 is arranged to pass and interrupt the irradiation of light from the light source 94 on a dot-by-dot basis for reproducing dots of an image on a photosensitive material 96. This embodiment is also applicable to a light source device with an electronic shutter in a printer or display such as a facsimile machine, copier, or scanner.

We claim:

1. An optical transmission line for transmitting a uniform intensity of light, comprising:

a first bundle of optical fibers having a light emitting end which emits diffused light components from each of the optical fibers of said first bundle;

a second bundle of optical fibers having a light receiving end, wherein said light receiving end optically confronts the light emitting end of said first bundle of optical fibers; and a reflector tube which has a mirrored surface on the inner side thereof and which maintains a gap between said first and second bundles of optical fibers, wherein said reflector tube is interposed between the light emitting end of said first bundle of optical fibers and the light receiving end of said second bundle of optical fibers so as to optically couple said first and second bundles, wherein said reflector tube redirects and distributes the diffused light components emitted from each of the optical fibers at the light emitting end of said first bundle into the optical fibers at the light receiving end of said second bundle, and wherein the gap of said reflector tube is a vacuum.

2. An optical transmitter for transmitting a uniform intensity of light, comprising:

a light source;

a first bundle of optical fibers having a light emitting end which emits diffused light components from each of the optical fibers of said first bundle and a light receiving end for receiving light emitted by said light source;

a second bundle of optical fibers having a light receiving end and a light emitting end, wherein said light receiving end optically confronts the light emitting end of said first bundle of optical fibers;

a reflector tube which has a mirrored surface on the inner side thereof and which maintains a gap between said first and second bundles of the optical fibers, wherein said reflector tube is interposed between the light emitting end of said first bundle of optical fibers and the light receiving end of said second bundle of optical fibers so as to optically couple said first and second bundles, wherein said reflector tube redirects and distributes the diffused light components emitted from each of the optical fibers at the light emitting end of said first bundle into the optical fibers at the light receiving end of said second bundle, and wherein the gap of said reflector tube is a vacuum; and an exposure device operatively coupled to the light emitting end of said second bundle.

3. A photographic printing apparatus for transmitting a uniform intensity of light and for performing exposure operations on a photosensitive material, comprising:

a light source;

a first bundle of optical fibers having a light emitting end which emits diffused light components from each of the optical fibers of said first bundle and a light receiving end for receiving light emitted by said light source;

a second bundle of optical fibers having a light receiving end and a light emitting end, wherein said light receiving end optically confronts the light emitting end of said first bundle of optical fibers;

distribution means interposed between the light emitting end of said first bundle of optical fibers and the light receiving end of said second bundle of optical fibers so as to optically couple said first and second bundles, wherein said distribution means redirects and distributes the diffused light components emitted from each of the optical fibers at the light emitting end of said first bundle into the optical fibers at the light receiving end of said second bundle; and a linear PLZT exposure head operatively coupled to the light emitting end of said second bundle and operating so as to perform exposure operations.

4. A photographic printing apparatus for transmitting a uniform intensity of light and for performing exposure operations on a photosensitive material, comprising:

a light source;

a first bundle of optical fibers having a light emitting end which emits diffused light components from each of the optical fibers of said first bundle and a light receiving end for receiving light emitted by said light source;

a second bundle of optical fibers having a light receiving end and a light emitting end, wherein said light receiving end optically confronts the light emitting end of said first bundle of optical fibers;

a reflector tube which has a mirrored surface on the inner side thereof and which maintains a gap between said first and second bundles of optical fibers, wherein said reflector tube is interposed between the light emitting end of said first bundle of optical fibers and the light receiving end of said second bundle of optical fibers so as to optically couple said first and second bundles, wherein said reflector tube redirects and distributes the diffused light components emitted from each of the optical fibers at the light emitting end of said first bundle into the optical fibers at the light receiving end of said second bundle, and wherein the gap of said reflector tube is a vacuum; and an exposure device operatively coupled to the light emitting end of said second bundle and operating so as to perform exposure operations.

5. A photographic printing apparatus according to claim 4, wherein said exposure device comprises a linear PLZT exposure head.

* * * * *